United States Patent
Roh

(10) Patent No.: US 6,680,885 B2
(45) Date of Patent: Jan. 20, 2004

(54) OPTICAL DISC SYSTEM FOR EFFICIENTLY CONTROLLING SLED MOTOR THEREOF

(75) Inventor: Seung-Jin Roh, Seoul (KR)

(73) Assignee: Samsung Electronics, Co., LTD, Kyungki-do (KR)

(*) Notice: Subject to any disclaimer, the term of this patent is extended or adjusted under 35 U.S.C. 154(b) by 392 days.

(21) Appl. No.: 09/779,299

(22) Filed: Feb. 8, 2001

(65) Prior Publication Data

US 2001/0014062 A1 Aug. 16, 2001

(30) Foreign Application Priority Data

Feb. 15, 2000 (KR) .................................. 00-7123

(51) Int. Cl.$^7$ ................................................ G11B 7/00
(52) U.S. Cl. ................... 369/44.28; 369/44.25; 369/53.23; 369/53.28
(58) Field of Search .................. 369/44.11, 44.14, 369/44.25, 44.28, 44.34, 47.17, 53.23, 53.28, 59.13, 59.27, 70, 30.13, 30.15, 30.16, 30.17

(56) References Cited

U.S. PATENT DOCUMENTS 5,351,226 A * 9/1994 Mizumoto et al. ........ 369/47.49
5,633,846 A * 5/1997 Okuyama et al. ........ 369/44.34
5,905,701 A * 5/1999 Lee et al. ................. 369/44.28

* cited by examiner

Primary Examiner—Doris H. To
Assistant Examiner—Jorge L Ortiz Criado
(74) Attorney, Agent, or Firm—F. Chau & Associates, LLP

(57) ABSTRACT

An optical disc system for efficiently controlling a sled motor is provided. The optical disc system has a sled motor for moving an optical pick-up; a digital servo core to generate a first and a second sled control signal; a microcomputer for generating a selecting signal, a third and a fourth sled control signal for controlling the sled motor; a first and a second selecting unit for receiving the selecting signal and selecting and outputting one of the first and third sled control signals and selecting and outputting one of the second and fourth sled control signals, respectively; and a third and a fourth selecting unit for respectively receiving the outputs of a first and second digital-to-analog converters and generating the respective outputs of the first and second digital-to-analog converters in response to the selecting signal to the sled motor.

12 Claims, 2 Drawing Sheets

OPTICAL DISC SYSTEM FOR EFFICIENTLY CONTROLLING SLED MOTOR THEREOF

BACKGROUND OF THE INVENTION

1. Field of the Invention

The present invention relates to an optical disc system, and more particularly, to an optical disc system and method for efficiently controlling a sled motor thereof.

2. Description of the Related Art

Early record players used for recording and reproducing audio signals such as human voice or songs were in the form of phonographs. Then, audio tapes were developed and used. In the early record players and audio tapes, the audio signals were recorded in the form of analog signals. Since the 1980s, optical disc players have superceded the record players. The optical disc players use an optical device such as a laser to reproduce information stored in an optical disc. In the optical disc, a voice signal is stored after converted into a digital signal. The optical disc can store a large amount of data representing voice signals and has a longer life span, which makes the optical disc more widely used than the record. The optical disc system includes a compact disc player (CDP), a compact disc ROM (CDROM), a digital versatile disc player (DVDP), etc.

In a conventional optical disc system, a digital servo for a sled jump uses a pulse width modulation (PWM) output unit for controlling a sled motor. The PWM output unit receives a tracking error signal from a high frequency amplifier. A digital servo core receives the tracking error signal, performs tracking loop filtering, sled loop filtering, and sled average filter processing, and then provides PWM output control signal and PWM output signals for controlling the sled motor. The PWM signals are input to an integrated circuit (IC) device for controlling and driving the sled motor.

The use of conventional PWM output signals for controlling the sled motor produce noises, primarily, due to the large signal swing of the PWM signals. Also, a heat problem can occur in the IC device for driving the sled motor.

Therefore, a need exists for an optical disc system which can control a sled motor by use of control signals with reduced noises and more efficiently operate the sled motor control. Further, it will be advantageous to provide an apparatus and method of controlling a sled motor in an optical disc system with reduced problems caused by the heat generated by the IC device for driving the sled motor.

SUMMARY OF THE INVENTION

To solve the above and other problems, it is an object of the present invention to provide an optical disc system for efficiently controlling a sled motor in a sled jump.

To accomplish the above and other objects of the present invention, there is provided an optical disc system for reproducing data stored in an optical disc, the optical disc system having a sled motor for moving an optical pick-up; a digital servo core for filtering a tracking error signal provided from the optical pick-up to generate a first sled control signal and a second sled control signal; a microcomputer for generating a selecting signal, a third sled control signal and a fourth sled control signal for controlling the sled motor; a first selecting unit for receiving the first and third sled control signals and for selectively outputting one of the first and third sled control signals in response to the selecting signal; a second selecting unit for receiving the second and fourth sled control signals and for selectively outputting one of the second and fourth sled control signals in response to the selecting signal; a third selecting unit for providing the sled motor with the one of the first and third sled control signals from the first selecting unit in response to the selecting signal; and a fourth selecting unit for providing the sled motor with the one of the second and fourth sled control signals from the second selecting unit in response to the selecting signal.

Preferably, the optical disc system further includes a first digital-to-analog converter for converting an output of the first selecting unit into an analog signal to provide the converted output of the first selecting unit to the third selecting unit, and a second digital-to-analog converter for converting an output of the second selecting unit into an analog signal to provide the converted output of the second selecting unit to the fourth selecting unit. It is preferable that in the optical disc system, each of the first through the fourth selecting units is a multiplexer. It is preferable that in the optical disc system, the third selecting unit receives a first reference signal and outputs either the one of the first and third sled control signals or the first reference signal in response to the selecting signal, and the fourth selecting unit receives a second reference signal and outputs either the one of the second and fourth sled control signals or the second reference signal in response to the selecting signal.

The present invention also provides a method for controlling a sled motor in an optical disc system, comprising the steps of detecting a tracking error from an optical disc to generate a tracking error signal; filtering the tracking error signal to generate a first set of sled control signals to control a sled motor; generating a second set of sled control signals to control the sled motor in response to a command from a microcomputer in the optical disc system; and selecting at least one sled control signal from either the first set of sled control signals or the second set of sled control signals under control of the microcomputer, wherein the at least one sled control signal is provided for controlling the sled motor.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art. The identical reference number in drawings indicates the identical elements.

Figure 1:
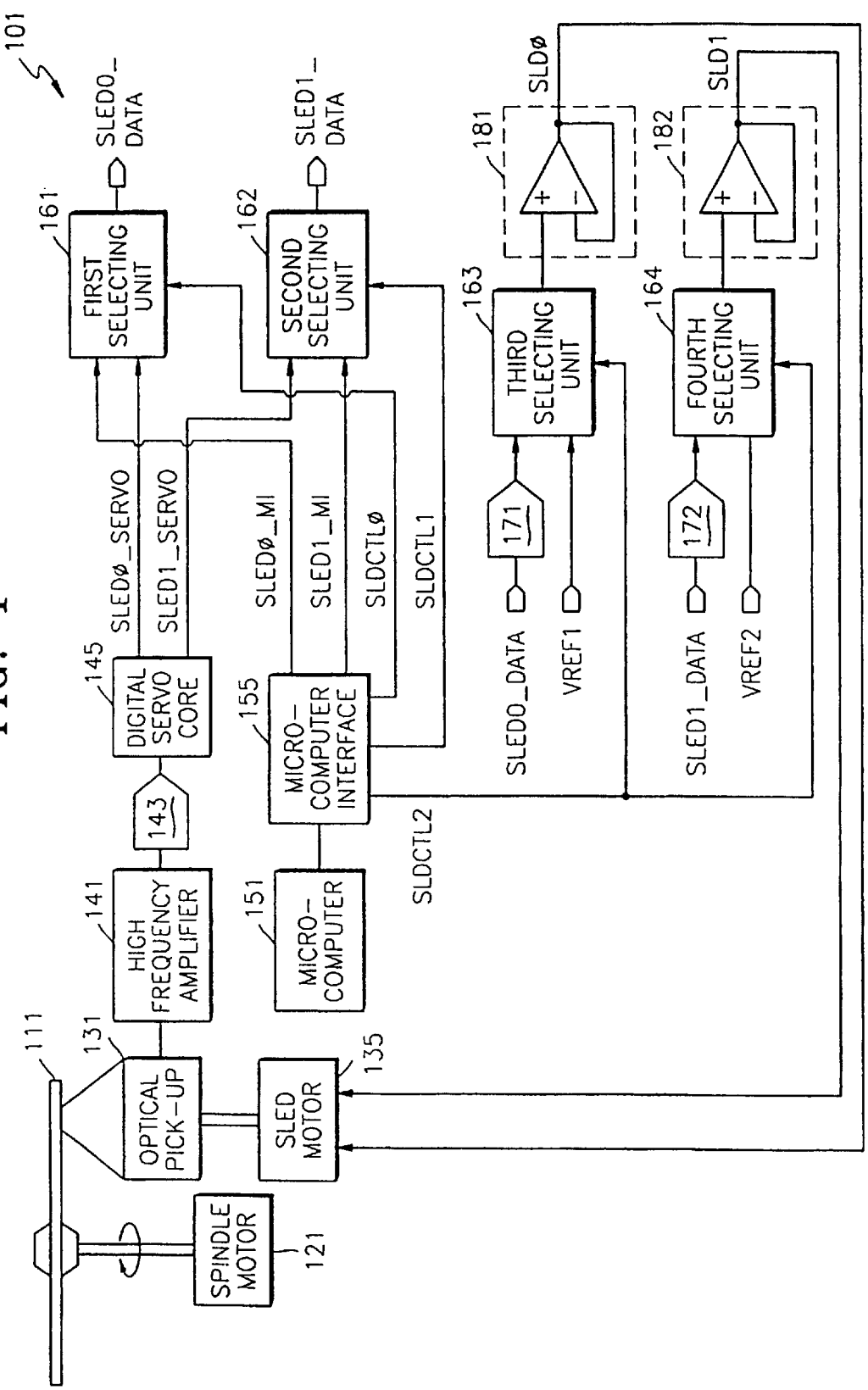
FIG. 1 is a schematic diagram of an optical disc system according to a preferred embodiment of the present invention.

FIG. 1 is a schematic diagram of an optical disc system according to a preferred embodiment of the present invention. The optical disc system 101 has a spindle motor 121, an optical pick-up 131, a sled motor 135, a high frequency amplifier 141, an analog-to-digital converter 143, a digital servo core 145, a microcomputer 151, a microcomputer interface 155, a first selecting unit through a fourth selecting unit 161 through 164, a first digital-to-analog converter 171 and a second digital-to-analog converter 172, and a first buffer 181 and a second buffer 182. Each of the first selecting unit through the fourth selecting unit 161 through 164 can be implemented by, for example, a multiplexer.

The spindle motor 121 rotates an optical disc 111 installed in the optical disc system 101.

The optical pick-up 131 generates a laser ray incident on a predetermined location of the optical disc 111 and picks up the reflected ray.

The sled motor 135 moves the optical pick-up 131 from an inner circumference to an outer circumference during a sled jump.

The high frequency amplifier 141 amplifies a signal picked up by the optical pick-up 131, removes noises and distortion from the signal using an internally installed waveform equalization circuit, corrects the pick-up signal, and then outputs the corrected pick-up signal.

The signal output from the high frequency amplifier 141 is an analog signal. The analog-to-digital converter 143 converts the analog signal output from the high frequency amplifier 141 into a digital signal.

The digital servo core 145 restores the original analog signal after receiving the digital signal output from the analog-to-digital converter 143. A voice signal is an analog signal. This analog signal is converted into a digital signal, interleaved and scrambled, and then stored in the optical disc 111. Therefore, to reproduce the original voice signal from the digital signal stored in the optical disc 111, the digital signal must be deinterleaved and descrambled, and erroneous data must be corrected. This is all done by the digital servo core 145.

Also, the digital servo core 145 filters a tracking error signal included in the digital signal output from the analog-to-digital converter 143, and generates a first sled control signal (SLED0_SERVO) and a second sled control signal (SLED1_SERVO). These two signals are required for controlling the operation of the sled motor 135 during a sled jump.

The microcomputer 151 generates a command for controlling the sled motor 135 as well as performs various functions for the proper operation of the optical disc system 101.

Interfacing a command output from the microcomputer 151, the microcomputer interface 155 generates a third sled control signal (SLED0_MI), and a fourth sled control signal (SLED1_MI), and a first selecting signal through a third selecting signal (SLDCTL0, SLDCTL1, and SLDCTL2).

The first selecting unit 161 receives the first selecting signal (SLDCTL0), selects one of the first sled control signal (SLED0_SERVO) output from the digital servo core 145 and the third sled control signal (SLED0_MI) output from the microcomputer interface 155, and outputs the selected signal as a first sled data (SLED0_DATA). For example, if the first selecting signal (SLDCTL0) is enabled to a logic high, the first selecting unit 161 outputs the first sled control signal (SLED0_SERVO) as the first sled data (SLED0_DATA), and if the first selecting signal (SLDCTL0) is disabled to a logic low, the first selecting unit 161 outputs the third sled control signal (SLED0_MI) as the first sled data (SLED0_DATA).

The second selecting unit 162 receives the second selecting signal (SLDCTL1), selects one of the second sled control signal (SLED1_SERVO) output from the digital servo core 145 and the fourth sled control signal (SLED1_MI) output from the microcomputer interface 155, and outputs the selecting signal as a second sled data (SLED1_DATA). For example, if the second selecting signal (SLDCTL1) is enabled to a logic high, the second selecting unit 162 outputs the second sled control signal (SLED1_SERVO) as the second sled data (SLED1_DATA), and if the second selecting signal (SLDCTL1) is disabled to a logic low, the second selecting unit 162 outputs the fourth sled control signal (SLED1_MI) as the second sled data (SLED1_DATA).

The first digital-to-analog converter 171 receives the first sled data (SLED0_DATA), and converts the data into an analog signal. The second digital-to-analog converter 172 receives the second sled data (SLED1_DATA), and converts the data into an analog signal.

The third selecting unit 163 receives the third selecting signal (SLDCTL2), and selects and outputs one of the output signal of the first digital-to-analog converter 171 and a first reference signal (VREF1) in response to the third selecting signal (SLDCTL2). The first reference signal (VREF1) preferably has a predetermined voltage level. For example, when the voltage level of the output signal of the first digital-to-analog converter 171 is higher than the voltage level of the first reference signal (VREF1), and the third selecting signal (SLDCTL2) is a logic high, the third selecting unit 163 is activated and outputs the output signal of the first digital-to-analog converter 171. When the voltage level of the output signal of the first digital-to-analog converter 171 is lower than the voltage level of the first reference signal (VREF1) and the third selecting signal (SLDCTL2) is a logic low, the third selecting unit 163 outputs the first reference signal (VREF1).

The fourth selecting unit 164 receives the third selecting signal (SLDCTL2), and selects and outputs one of the output signal of the second digital-to-analog converter 172 and a second reference signal (VREF2) in response to the third selecting signal (SLDCTL2). The second reference signal (VREF2) preferably has a predetermined voltage level. For example, when the voltage level of the output signal of the second digital-to-analog converter 172 is higher than the voltage level of the second reference signal (VREF2), and the third selecting signal (SLDCTL2) is a logic high(?), the fourth selecting unit 164 is activated and outputs the output signal of the second digital-to-analog converter 172. When the voltage level of the output signal of the second digital-to-analog converter 172 is lower than the voltage level of the second reference signal (VREF2) and the third selecting signal (SLDCTL2) is a logic low, the fourth selecting unit 164 outputs the second reference signal (VREF2).

The first buffer 181 buffers the output of the third selecting unit 163 and generates a first sled motor control signal (SLD0), and the second buffer 182 buffers the output of the fourth selecting unit 164 and generates a second sled motor control signal (SLD1). The first and second sled motor control signals (SLD0 and SLD1) are provided to the sled motor 135 through an IC circuit apparatus for driving the sled motor (not shown). The first and second sled motor control signals (SLD0 and SLD1) control the operation of the sled motor 135.

The entire operation of the optical disc system 101 will now be explained.

A tracking error signal (TE) detected by the optical pick-up 131 is input to the digital servo core 145 through the high frequency amplifier 141. The digital servo core 145 receives the tracking error signal (TE), filters the signal (TE), and generates the first sled control signal (SLED0_SERVO) and the second sled control signal (SLED1_SERVO). The microcomputer interface 155 receives addresses and commands from the microcomputer 151, and outputs the first selecting signal through the third selecting signal (SLDCTL0 through SLDCTL2), and the third and fourth sled control signals (SLED0_MI and SLED1_MI). By the first and second selecting signals (SLDCTL0 and SLDCTL1), one of the first sled control signal (SLED0_SERVO) and the third sled control signal (SLED0_MI) is selected and output as the first sled data (SLED0_DATA), and one of the second sled control signal (SLED1_SERVO) and the fourth sled control signal (SLED1_MI) is selected and output as the second sled data (SLED1_DATA). By the third selecting signal (SLDCTL2), one of the first sled data (SLED0_DATA) and the first reference signal (VREF1) is selected and output as the first sled motor control signal (SLD0), and one of the second sled data (SLED1_DATA) and the second reference signal (VREF2) is selected and output as the second sled motor control signal (SLD1). The first and second sled motor control signals (SLD0 and SLD1) are input to the IC device for driving the sled motor to control the operation of the sled motor 135.

By implementing the optical disc system 101 as described above, the sled motor 135 is controlled by the digital servo core 145 and can also be controlled by the microcomputer 151.

Figure 2:
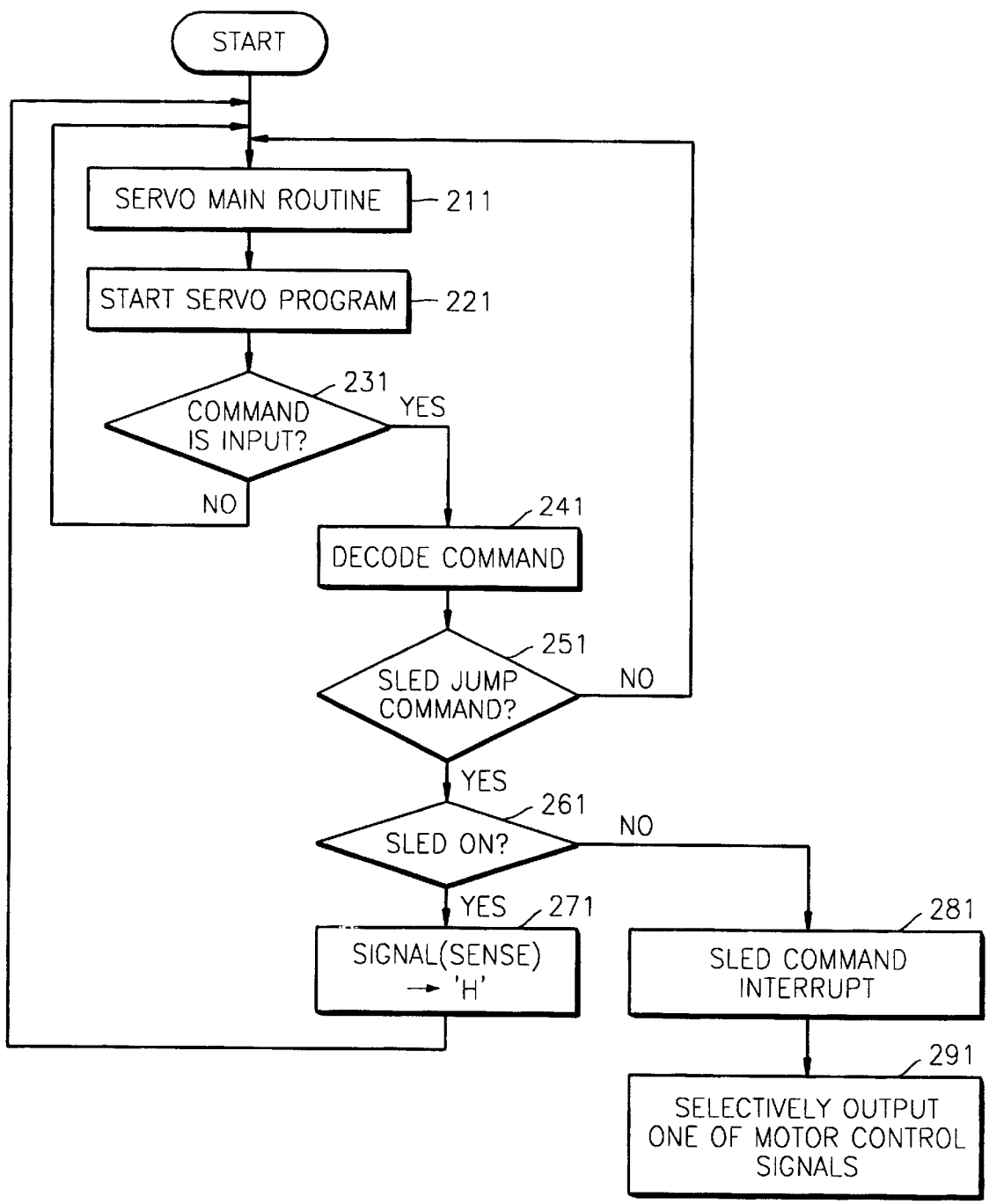
FIG. 2 is a flowchart of a method for controlling the sled motor of an optical disc system according to the present invention.

FIG. 2 is a flowchart of a method for controlling the sled motor of an optical disc system according to the present invention. The method described in the flowchart of FIG. 2 can be applied to the optical disc system in FIG. 1. Referring to FIGS. 1 and 2, the method for controlling the sled motor of an optical disc system according to the present invention will now be explained.

First, the optical disc system 101 performs a servo main routine when power is on in step 211. Then a servo program begins in step 221 and a command is input. At this time, whether or not the command is input from the microcomputer 151 is checked in step 231. If the command is not input from the microcomputer 151, the servo main routine of the step 211 is repeated. If the command is input from the microcomputer 151, the command is decoded in step 241.

If the result of decoding the command is not a sled jump command, the servo main routine of the step 211 is repeated. If the result of decoding the command is a sled jump command, whether the command indicates sled-on or sled-off is checked in steps 251 and 261. If the command indicates sled-on, a signal (SENSE) that indicates the completion of executing the microcomputer command is made to be a logic high in step 271 and then the servo main routine of the step 211 is repeated. If the command indicates sled-off, a sled command interrupt routine begins in step 281. In the sled command interrupt routine of the step 281, one of the first and second sled motor control data (SLD0 and SLD1) is selectively output by the optical disc system 101 in step 291.

According to the present invention as described above, the sled motor 135 of the optical disc system 101 can be controlled by any one of the digital servo core 145 and the microcomputer 151, and therefore the control of the sled motor 135 becomes efficient. Advantageously, the present invention has reduced or eliminated the problems associated with wide signal swings in the PWM signals used to control the sled motor.

The preferred embodiments of the present invention have been explained in the drawings and specification. Although specific terminologies are used here, those are only to explain the embodiments of the present invention. Therefore, the present invention is not restricted to the above-described embodiments and many variations are possible within the spirit and scope of the present invention. The scope of the present invention is not determined by the description but by the accompanying claims.

What is claimed is:

1. An optical disc system for reproducing data stored in an optical disc, the optical disc system comprising:
    a sled motor for moving an optical pick-up;
    a digital servo core for filtering a tracking error signal provided from the optical pick-up to generate a first sled control signal and a second sled control signal;
    a microcomputer for generating a first selecting signal, a second selecting signal, a third selecting signal, a third sled control signal and a fourth sled control signal for controlling the sled motor;
    a first selecting unit for receiving the first and third sled control signals and for selectively outputting one of the first and third sled control signals in response to the first selecting signal;
    a second selecting unit for receiving the second and fourth sled control signals and for selectively outputting one of the second and fourth sled control signals in response to the second selecting signal;
    a third selecting unit for providing the sled motor with one of the first and third sled control signals from the first selecting unit in response to the third selecting signal; and
    a fourth selecting unit for providing the sled motor with one of the second and fourth sled control signals from the second selecting unit in response to the third selecting signal.

2. The optical disc system of claim 1, wherein each of the first through the fourth selecting units is a multiplexer.

3. The optical disc system of claim 1, wherein the third selecting unit receives a first reference signal and outputs either one of the first and third sled control signals or the first reference signal in response to the selecting signal, and the fourth selecting unit receives a second reference signal and outputs either one of the second and fourth sled control signals or the second reference signal in response to the selecting signal.

4. The optical disc system of claim 3, wherein the first and second reference signals are predetermined first and second reference voltages, respectively.

5. The optical disc system of claim 1, further including:
    a first digital-to-analog converter for converting an output of the first selecting unit into an analog signal to provide the converted output of the first selecting unit to the third selecting unit; and
    a second digital-to-analog converter for converting an output of the second selecting unit into an analog signal to provide the converted output of the second selecting unit to the fourth selecting unit.

6. The optical disc system of claim 1, wherein the microcomputer generates a first select signal to control the first selecting unit, a second select signal to control the second selecting unit, and a third select signal to control the third and fourth selecting units.

7. A method for controlling a sled motor in an optical disc system, comprising the steps of:
    detecting a command to control the sled motor provided from a microcomputer during a servo program;

determining whether the command is a sled jump command;

determining whether the command indicates sled-off when the command is the sled jump command;

performing a sled command interrupt routine when the command indicates the sled-off;

providing the sled motor with sled motor control signals generated from the microcomputer and a servo device receiving a tracking error detected from an optical disc; and repeating the servo program when the command is determined not to be a sled jump command.

8. The method of claim 7, further including repeating the servo program when the command is determined to indicate sled-on.

9. The method of claim 7, wherein the step of providing the sled motor control signals includes providing the sled motor with a control signal generated from one of the microcomputer and the servo device.

10. A method for controlling a sled motor in an optical disc system, comprising the steps of:

detecting a tracking error from an optical disc to generate a tracking error signal;

filtering the tracking error signal to generate a first set of sled control signals to control a sled motor;

generating a second set of sled control signals to control the sled motor in response to sled data from a microcomputer in the optical disc system; and selecting at least one sled control signal from either the first set of sled control signals or the second set of sled control signals based on the sled data from the microcomputer, wherein the at least one sled control signal is provided for controlling the sled motor.

11. The method of claim 10, further including the steps of:

(a) comparing the at least one sled control signal with a reference signal;

(b) selecting one of the at least one sled control signal and the reference signal in response to a control signal from the microcomputer; and (c) providing the one selected in the selecting step (b) to the sled motor.

12. The method of claim 10, wherein the step of selecting at least one sled control signal includes the steps of:

(d) selecting a first sled control signal from either the first or the second set of sled control signals;

(e) selecting a second sled control signal from either the first or the second set of sled control signals;

(f) comparing the first sled control signal with a first reference signal;

(g) comparing the second sled control signal with a second reference signal;

(h) selecting one of the first sled control signal and the first reference signal;

(i) selecting one of the second sled control signal and the second reference signal; and (j) providing the ones selected in the selecting steps (h) and (i) to the sled motor.

* * * * *